United States Patent
Quiram

[15] 3,706,188
[45] Dec. 19, 1972

[54] ELEVATING APPARATUS FOR TRACTOR ATTACHMENTS

[72] Inventor: Ronald G. Quiram, Michigan City, Ind.

[73] Assignee: Poloron Products of Indiana, Inc., New Rochelle, N.Y.

[22] Filed: Jan. 3, 1972

[21] Appl. No.: 214,546

[52] U.S. Cl.................................56/11.6, 56/15.8
[51] Int. Cl. ............................................A01d 35/25
[58] Field of Search............56/11.6, 15.8, 15.9, 16.3, 56/DIG. 22

[56] References Cited

UNITED STATES PATENTS

| | | |
|---|---|---|
| 3,169,358 | 2/1965 | Ertsgaard et al. ......................56/10.5 |
| 3,460,325 | 8/1969 | Musgrave..............................56/11.6 |
| 3,461,654 | 8/1969 | Plamper ................................56/11.6 |
| 3,550,364 | 12/1970 | Musgrave..............................56/15.8 |

*Primary Examiner*—Russell R. Kinsey
*Attorney*—Eugene E. Geoffrey, Jr.

[57] ABSTRACT

An elevating mechanism for tractor attachments such as mowing apparatus which includes a pair of vertically disposed plates secured to the attachment and having inclined slots engaged by pins carried by the tractor so that as the pins are displaced longitudinally the attachment carried by the plates will be displaced vertically.

11 Claims, 9 Drawing Figures

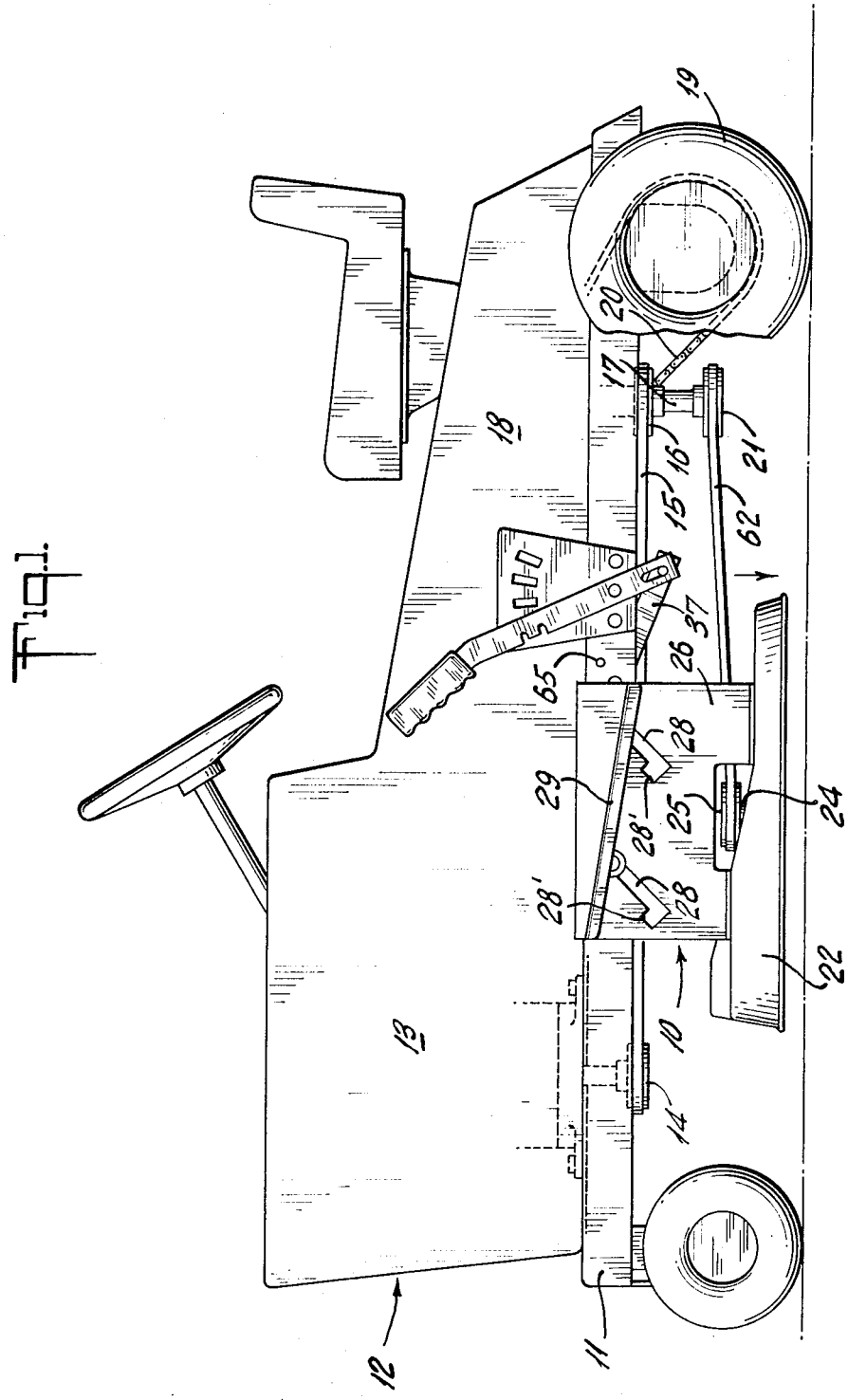

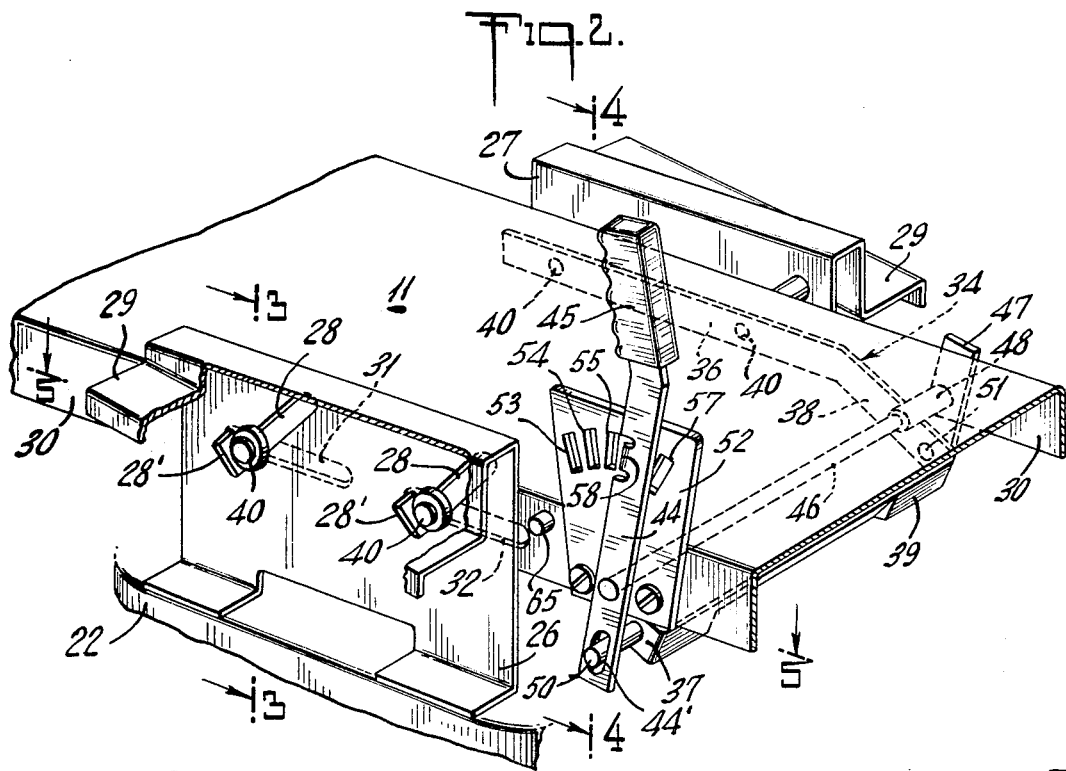

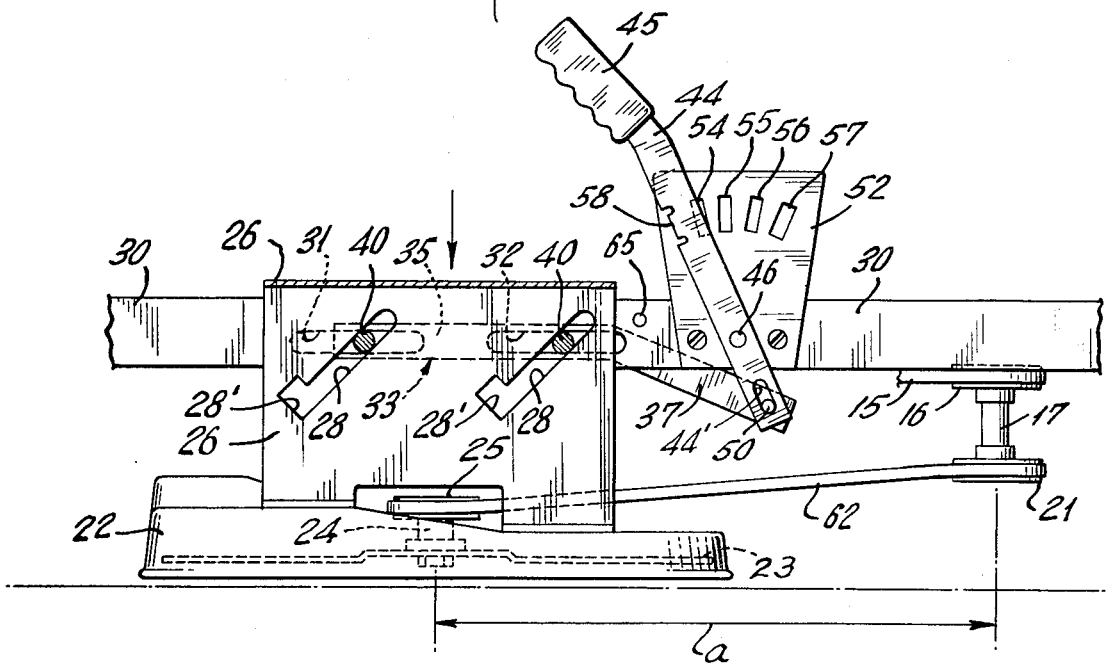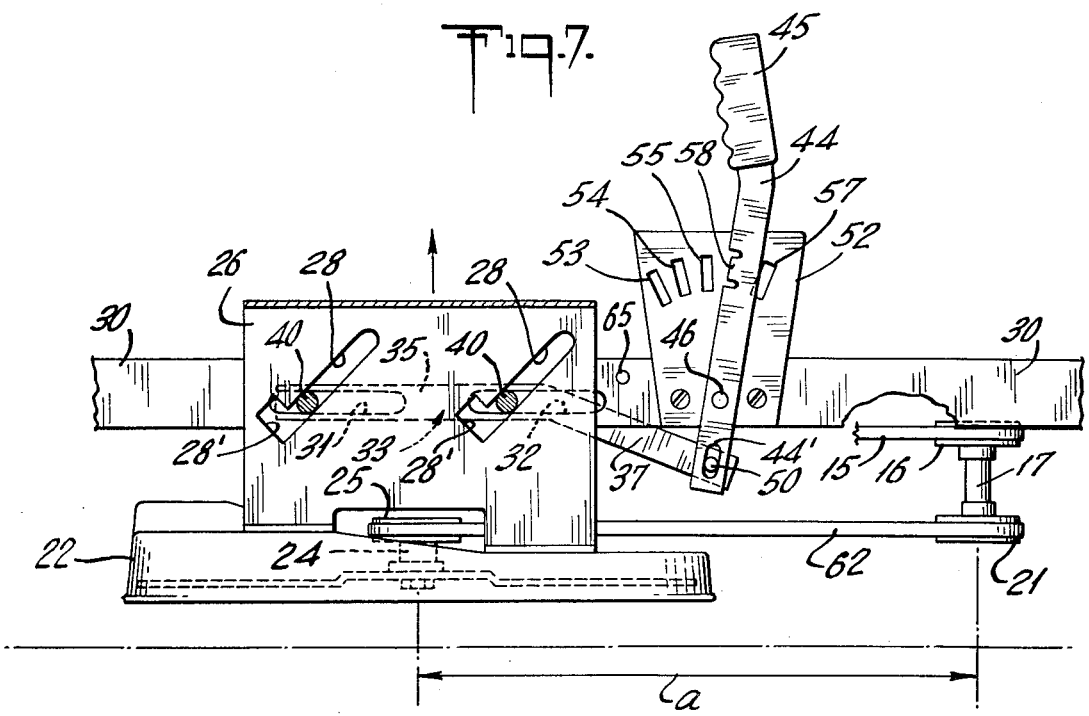

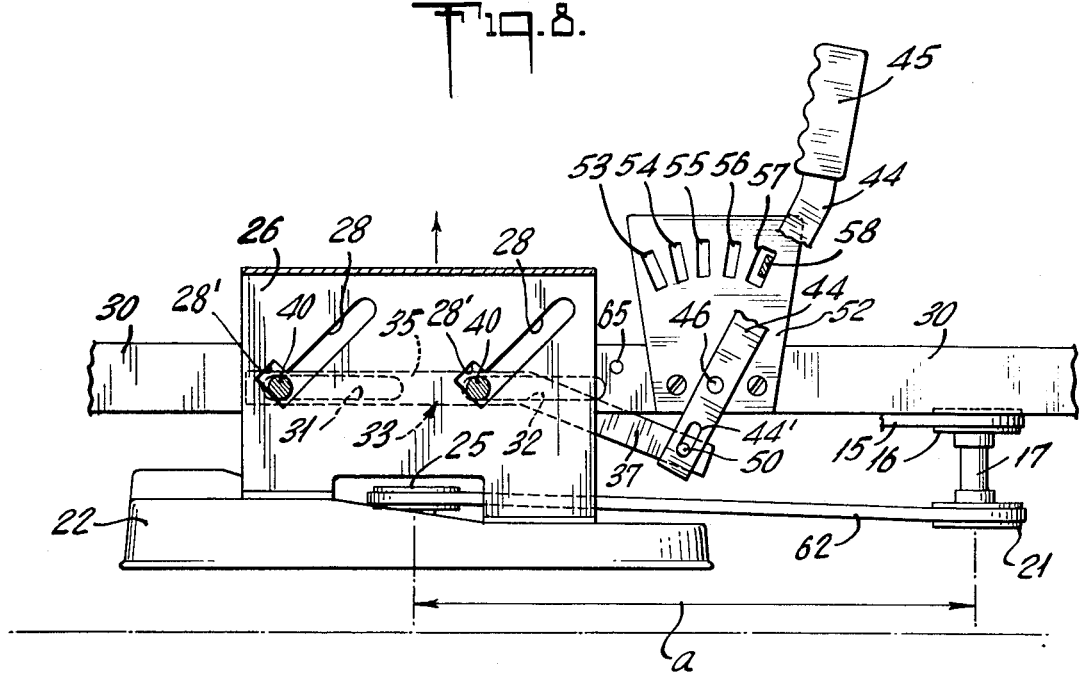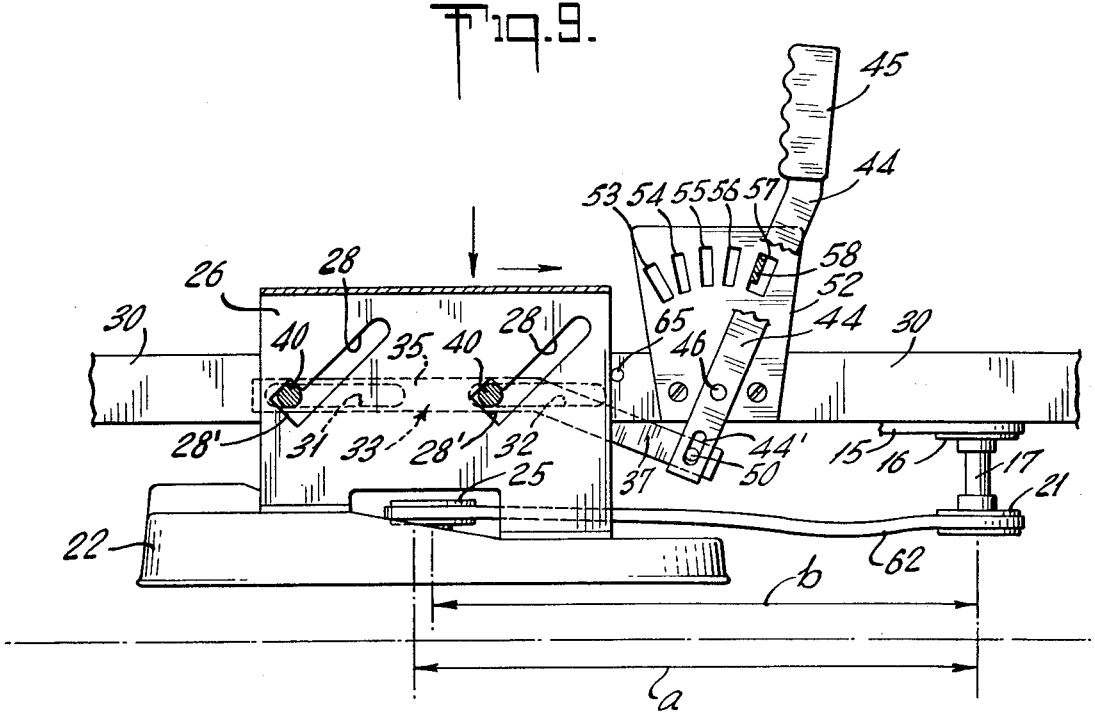

ELEVATING APPARATUS FOR TRACTOR ATTACHMENTS

This invention relates to tractors and more specifically to novel and improved means for raising and lowering the grass cutting and other attachments for motor driven tractors.

Various devices have been proposed for raising and lowering grass cutting and other devices on riding mowers such as lawn tractors and the like, but they involved relatively complicated structures inasmuch as it is desirable to raise the entire cutter or other attachment uniformly and maintain predetermined alignment with the ground surface. This invention provides an improved arrangement of elements which insures maintenance of alignment and, at the same time, affords a high degree of dependability and ease of adjustment and maintenance at a relatively low cost.

Another object of the invention resides in the provision of a novel and improved adjustable support for grass cutting attachments on riding mowers to enable the mower to be raised and lowered and, when not in use, locked securely in the raised position.

Still another object of the invention resides in the provision of a novel and improved support for a grass cutting attachment on riding mowers for raising and lowering the attachment and, at the same time, disengaging the attachment automatically by moving it to the uppermost position.

The improved elevating means for grass cutting and other power driven attachments includes a pair of side supports having angularly disposed slots which engage horizontally displacable pins carried by the tractor frame. Displacement of the pins moves the attachment vertically and when the attachment is in the uppermost position, offset slots of the lower end of the angularly disposed slots permit the attachment to move horizontally to disengage the attachment from the driving means.

The above and other objects and advantages of the invention will become more apparent from the following description and accompanying drawings forming part of this application.

In the Drawings:

FIG. 1 is a side elevational view of a tractor with the novel and improved elevating means for a grass cutting attachment mounted thereon.

FIG. 2 is an enlarged perspective view with positions broken away and shown in section of a fragmentary portion of the tractor frame and elevating mechanism for raising and lowering the cutting attachment.

FIGS. 3, 4 and 5 are further enlarged cross-sectional views of FIG. 2 taken along the lines 3—3, 4—4 and 5—5 thereof.

FIG. 6 is a side elevational view of FIG. 2 with the cutting attachment in the lowermost position.

FIG. 7 is a side elevational view similar to FIG. 6 but with the cutting attachment in the highest cutting position.

FIGS. 8 and 9 are side elevational views similar to FIG. 6 showing the steps for movement of the cutting attachment to the declutched or disengaged position.

Referring to the drawings, the cutting attachment and elevating apparatus according to the invention is generally denoted by the numeral 10 and carried centrally of the frame 11 of the tractor 12. Power for the tractor is provided by a suitable motor or engine disposed within the tractor compartment 13 and coupled to the drive pulley 14. The pulley 14 is in turn coupled by a belt 15 to a pulley 16 which is carried by a shaft 17 for transmitting power to a transmission within compartment 18 and, thence, to the rear wheels 19 by a chain 20. The shaft 17 also carries a second pulley 21 for driving the cutting attachment 10.

The cutting attachment 10 with the vertical adjusting means therefor is shown in FIGS. 1 through 5. The attachment includes a blade housing 22 carrying one or more cutting blades 23 (see FIG. 6) driven by a vertically disposed shaft 24 and pulley 25. The blade housing 22 is carried by a pair of side plates 26 and 27 welded or otherwise secured to the housing. Each plate 26, 27 has a pair of spaced slots 28 with each slot being inclined upwardly and to the rear at an angle of about 45 degrees. The lower end of each slot 28 terminates in a short reversely inclined slot portion 28' The upper edge of each plate 26 and 27 carries an inclined foot rest 29 spaced outwardly from and formed integrally with the associated plate.

The tractor frame 11 has depending side walls 30 each having a pair of horizontally disposed aligned slots 31 and 32. Each plate is secured to the tractor frame by a pair of bolts or pins 40 slidably engaging the inclined slots 28 and the cooperating horizontal slots 31 and 32 and carried by cooperating control arms 33 and 34. The forward portions 35 and 36 of arms 33 and 34 are parallel to the side walls 30 of the frame 11 while the rear portions 37 and 38 are inclined downwardly to the rear. The rear ends of the control arms 33 and 34 are connected by a transverse member 39 to effect simultaneous movement of the arms.

Each bolt 40 includes a sleeve 41, a pair of spacers 42 disposed on opposite sides of the associated plate 26, 27 as the case may be and a washer 43. The bolts threadably engage cooperating threaded openings in the arms 35 and 36 and the sleeves have lengths sufficient to provide adequate clearance to enable the sleeves to slide in the slots 28, 28', 31 and 32.

Longitudinal displacement of the arms 35 and 36 is effected by a lever 44 having a handle 45. The lower end of lever 44 is affixed to one end of a transverse shaft 46 rotatably carried by the depending frame walls 30. The opposite end of the shaft carries a sleeve 48 secured thereto by a pin 49 and a lever 47 affixed to the outer end of said sleeve. In this way, angular displacement of the lever 44 will effect equivalent angular displacement of lever 47. The lower ends of the levers 44 and 47 have elongated slots 44' and 47' to receive pins 50 and 51 affixed to and extending from the ends of the arm portions 37 and 38 as may be observed more clearly in FIGS. 2 and 4. The angular position of the lever 44 is controlled by a plate 52 having a plurality of openings 53 through 57 which are engaged by a tab 58 carried by the lever 44. A spring 59 surrounding the shaft 46 and held in a compressed position against the frame wall 30 by a washer 60 and pin 61 holds the tab 58 in releasable engagement with the slots or openings 53 through 57.

With the foregoing arrangement, angular displacement of the lever 44 will displace the bolts 40 longitudinally. When the lever 44 is in engagement with one of the slots 53 to 56, the plates 26 and 27 would tend to move downwardly and forwardly until the upper ends of the slots 28 engaged the bolts or pins 40. This movement however is restricted by the belt 62 and the weight of the cutting attachment will therefore maintain the belt in tight engagement with the pulleys 25 and 21 to drive the blades 23. Thus, since the belt 62 restricts forward motion of the cutting attachment, as the lever 44 is moved to successive slots 53 to 56 in plate 52, the cutting attachment will move from the lowermost cutting position as shown in FIG. 6 to the uppermost cutting position as shown in FIG. 7. Disengagement of the cutting attachment is effected by moving the lever 44 into engagement with the slot 57 as shown in FIG. 8. At this point, the bolts 40 are in the lowermost positions in the slots 28 with the result that the cutting attachment 10 moves downwardly to the rear so that the bolts 40 engage slot portions 28' as shown in FIG. 9 and the plates abut pins 65 carried by the frame. This action reduces the center to center distance between shafts 17 and 24 from a distance $a$ wherein the power is transmitted to the shaft 24 to a distance $b$ which produces slack in the belt 62 so that it will slip and therefore disengage the cutting mechanism. To operate the cutting attachment, the lever 44 need only be moved forwardly to one of the cutting positions 53 to 56 inclusive.

Thus, the invention as described above not only provides a series of cutting positions for the attachment 10, but also automatically disengages the cutting attachment from the power source when moved to the uppermost position. Furthermore, since the footrests 29 are formed as part of the plates 26 and 27, the weight of the operator's feet on the footrests will function to increase frictional engagement of the belt 62 with pulleys 21 and 25 when the attachment is in one of the operating positions. It is also evident that the elevating mechanism may be used with other types of driven attachments.

While only one embodiment of the invention has been illustrated and described, it is apparent that alterations, modifications and changes may be made without departing from the true scope and spirit thereof as defined by the appended claims.

What is claimed is:

1. An elevating mechanism for an attachment carried by a powered vehicle comprising at least two vertically disposed members secured at one end to the attachment to be elevated and having inclined slots, pins carried by said vehicle for movement relative thereto in a substantially horizontal plane and engaging said slots, means for moving said pins and means restricting movement of said vertically disposed members in the direction of movement of said pins.

2. An elevating mechanism according to claim 1 wherein said attachment embodies means to be power driven and said movement resisting means comprises power transmitting means coupled to the vehicular power source and to said attachment.

3. An elevating mechanism according to claim 2 wherein said power transmitting means comprises a power driven pulley carried by said tractor, a pulley carried by said attachment and a belt engaging said pulleys.

4. An elevating mechanism according to claim 1 wherein said vertically disposed members comprise a pair of spaced vertically disposed plates positioned in substantially parallel relationship to the longitudinal axis of said vehicle, each of said plates having at least two of said inclined slots with said slots sloping downwardly and forwardly.

5. An elevating mechanism according to claim 4 wherein said attachment includes power driven means and a pulley coupled to the last said means and said restricting means comprises a belt engaging said pulley with a driven pulley carried by said vehicle and disposed rearwardly of said attachment.

6. An elevating mechanism according to claim 5 wherein each of said slots terminates at its lower end in a forwardly extending inclined slot and said vehicle includes stops positioned rearwardly of said plates and spaced therefrom when said pins are in engagement with the first said slots whereby said plates and said attachment upon being raised to the uppermost position by forward displacement of said pins will bring said pins into alignment with said terminal slots and permit said attachment to shift rearwardly against said stops to loosen said belt and terminate the transmission of power to said attachment.

7. An elevating mechanism according to claim 4 wherein said attachment includes rotary blades for grass cutting and includes a pulley for rotating said blades, said vehicle includes a frame and front and rear wheels with said attachment and plates disposed forwardly of said rear wheels, said frame includes sets of horizontally formed slots on each side thereof aligned with the longitudinal axis of said vehicle and each of said pins engages one of said horizontal and one of said inclined slots, and said restricting means includes a belt engaging said pulley with a power driven pulley carried by said frame and disposed rearwardly of said attachment.

8. An elevating mechanism according to claim 7 wherein each of said slots terminates at its lower end in a forwardly extending inclined slot and said vehicle includes stops positioned rearwardly of said plates and spaced therefrom when said pins are in engagement with the first said slots whereby said plates and said attachment upon being raised to the uppermost position by forward displacement of said pins will bring said pins into alignment with said terminal slots and permit said attachment to shift rearwardly against said stops to loosen said belt and terminate the transmission of power to said attachment.

9. An elevating mechanism according to claim 7 wherein said plates each carry a footrest.

10. The combination with a tractor including a frame portion having a pair of elongated slots on each side thereof, of elevating means for an attachment carried by said frame portion, said elevating means comprising a pair of spaced parallel plates each having a pair of inclined openings therein, a control arm positioned on each side of said frame, at least two pins extending from each control arm with the pins on one arm each engaging a slot in one side of said frame portion and an inclined slot in one of said plates and the pins on the other arm, each engaging a slot on the other side of said frame portion and an inclined slot in the other of said plates, means coupled to said arms for longitudinal movement thereof and means restricting longitudinal displacement of said plates at least in one direction.

11. The combination according to claim 10 wherein said attachment includes a shaft to be driven and a pulley carried by said shaft, said tractor includes a driven pulley, and said restricting means comprises a power transmitting belt engaging said attachment and tractor pulleys.

* * * * *